United States Patent [19]

Inaga

[11] 3,764,757

[45] Oct. 9, 1973

[54] MAGNETIC RECORDING AND/OR REPRODUCING APPARATUS WITH TAPE GUIDE AND PICK-UP SYSTEM FOR USE WITH A TAPE CARTRIDGE

[75] Inventor: Katsu Inaga, Setagaya-ku, Tokyo, Japan

[73] Assignee: Sony Corporation, Tokyo, Japan

[22] Filed: Feb. 4, 1972

[21] Appl. No.: 223,552

[30] Foreign Application Priority Data

Feb. 9, 1971 Japan .................................. 46/5505
Apr. 23, 1971 Japan ................................ 46/32510

[52] U.S. Cl. ............ 179/100.2 ZA, 179/100.2 T, 242/55.19 A, 274/4 E

[51] Int. Cl. ....................... G11b 23/04, G11b 15/66

[58] Field of Search ............... 179/100.2 Z, 100.2 T, 179/100.2 MD; 274/4 C, 4 D, 4 E; 242/55.19 A, 197, 200

[56] References Cited

UNITED STATES PATENTS

| | | | |
|---|---|---|---|
| 3,681,539 | 8/1972 | Eibensteiner | 179/100.2 T |
| 3,660,614 | 5/1972 | Swain | 179/100.2 Z |
| 3,673,348 | 6/1972 | Larkin | 179/100.2 Z |
| 3,665,114 | 5/1972 | Hathaway | 179/100.2 Z |
| 3,665,120 | 5/1972 | Larkin | 179/100.2 Z |
| 3,643,038 | 2/1972 | Sato | 179/100.2 T |
| 3,669,457 | 6/1972 | Kaisha | 179/100.2 Z |
| 3,674,942 | 7/1972 | Sugaya | 179/100.2 Z |

*Primary Examiner*—Terrell W. Fears
*Assistant Examiner*—Alfred H. Eddleman
*Attorney*—Lewis H. Eslinger et al.

[57] ABSTRACT

In a magnetic recording and/or reproducing apparatus having a tape guide drum, at least one rotary magnetic head moved in a circular path coinciding with the circumferential surface of the drum for scanning a magnetic tape wrapped about at least a portion of that surface, a tape supply, such as, a cassette containing reels on which a magnetic tape is wound, and a holder for receiving and positioning the tape supply at a distance from the guide drum; a first tape engaging member is provided for drawing an initial loop of tape from the supply across an arcuate path of travel of a rotatable support, for example, a ring, which extends around the guide drum, and a second tape engaging member carried by the rotatable support engages the initial tape loop and further extends the loop for wrapping one side of the extended tape loop about at least a portion of the guide drum surface in response to turning of the rotatable support. The second tape engaging member is preferably constituted by a pinch roller which is brought adjacent a capstan for cooperating with the latter in driving the tape after the latter has been wrapped about the guide drum. Further, the rotatable support also carries additional tape guide members which engage the other or return side of the extended loop for holding such return side away from the guide drum surface.

16 Claims, 8 Drawing Figures

MAGNETIC RECORDING AND/OR REPRODUCING APPARATUS WITH TAPE GUIDE AND PICK-UP SYSTEM FOR USE WITH A TAPE CARTRIDGE

This invention relates generally to magnetic recording and/or reproducing apparatus, such as, video tape recording and reproducing apparatus (VTR), and more particularly is directed to an improved automatic tape loading and unloading device for such apparatus.

Existing video tape recording and reproducing apparatus generally comprise a tape guide drum having a rotary magnetic head assembly associated therewith to record or reproduce video signals on a magnetic tape which is usually wound on supply and take-up reels with the tape between such reels being wrapped about at least a portion of the circumferential surface of the drum and being driven by a cooperating capstan and pinch roller and by suitable rotation of the take-up reel. In preparing such a video tape recording and reproducing apparatus for operation, the tape extending between the supply and take-up reels must be placed around or wrapped about at least a portion of the drum circumference so that the tape will be guided thereby with respect to the rotary magnetic head assembly. In the conventional apparatus, it has generally been necessary for the user to manually thread the tape from the supply reel through various guide members, around the guide drum and between the capstan and pinch roller, and then back to the take-up reel. Further, upon the completion of the recording or reproducing of video signals on a particular magnetic tape, it has been necessary for the user to manually remove the tape from the guide drum and then to manually rotate the supply or take-up reel for returning the resulting loose tape thereto prior to the removal of the reels from the apparatus. The foregoing operations require considerable manual dexterity and are time consuming. If the tape is not properly threaded, damage to the tape and defective recording or reproducing of the signals may result. Further, if there is foreign matter on the user's fingers when handling the tape during the manual loading or unloading of the tape about the guide drum, such foreign matter can be transmitted to the tape and may adversely affect the fidelity of the recording or reproducing of the signals.

Automatic tape loading and unloading devices have been previously proposed to avoid the above mentioned disadvantages. A particularly desirable automatic tape loading and unloading device for a video signal recording and/or reproducing apparatus is disclosed in detail in copending U.S. Pat. application Ser. No. 113,988, filed Feb. 9, 1971, and having a common assignee herewith. In such automatic tape loading and unloading device, a rotatable support member, in the form of a ring, extends around the guide drum and carries a plurality of tape guides which define an arcuate guide path spaced from the drum, and a tape engaging member is also mounted on the rotatable support member and is movable with respect to the latter into and out of the arcuate guide path. In an inactive or starting condition of the device, the tape engaging member is displaced out of the guide path so as to engage the tape between the take-up and supply reels which may be contained in a cassette or cartridge, and the tape engaging member is moved into the guide path upon turning of the rotatable support member during a loading operation to draw a loop of the tape from one or both of the reels and to wrap one side of the loop about the guide drum while the other side of the loop is engaged by the tape guides and is maintained by the latter away from the surface of the guide drum. During the tape unloading operation of the device, the tape engaging member remains in the guide path during the major portion of its movement with the rotatable support member for unwrapping the tape from about the guide drum and, at the conclusion of the tape unloading operation, the tape engaging member is moved out of the guide path so as to permit the return or rewinding of the tape which constituted the loop on at least one of the reels.

Although the above described tape loading and unloading device as disclosed in the identified copending application is generally satisfactory, the mechanisms required for effecting the necessary movements of the tape engaging member with respect to the rotatable support member or ring on which it is mounted tend to undesirably increase the complexity of the device and the space required therefor, and further the reliability of its operation is not completely sufficient.

Accordingly, it is an object of this invention to provide a magnetic recording and/or reproducing apparatus of the described type with an automatic tape loading and unloading device which avoids all of the disadvantages of the devices previously proposed for the stated purposes.

Another object is to provide an automatic tape loading and unloading device which is relatively simple in construction and operation, and which is also relatively compact so as to minimize the space required for such device.

Still another object is to provide an automatic tape loading and unloading device which is thoroughly reliable in its operation.

A further object is to provide an automatic tape loading and unloading device, as aforesaid, that is adapted for use in connection with a magnetic recording and/or reproducing apparatus employing a magnetic tape contained in a cassette or cartridge.

In accordance with an aspect of this invention, an automatic tape loading and unloading device for a magnetic recording and/or reproducing apparatus comprises a rotatable support, for example, in the form of a ring, turnable around the guide drum in an arcuate path that extends between the latter and the holder provided for receiving and positioning the tape supply, that is, the supply and take-up reels having the tape wound thereon and which may be contained in a cassette or cartridge housing, a first tape engaging member for example, in the form of a tape guide pin carried by a lever which is swingable about a fixed pivot, and which is movable between an inactive position where it is engageable with the tape extending between the reels and an operative position where the first tape engaging member draws an initial loop of the tape from one or both of the reels across the rotatable support between the holder and guide drum, and a second tape engaging member carried by the rotatable support to move with the latter in the mentioned arcuate path for engaging the initial loop of tape formed by the first tape engaging member and further extending the loop for wrapping one side of the extended loop about at least a portion of the circumferential surface of the guide drum for scanning by the rotary head or heads associated with the latter.

In a preferred embodiment of the invention, the second tape engaging member carried by the rotatable support member is in the form of a pinch roller which, in addition to extending the loop and wrapping one side of the extended loop about the guide drum circumference in response to turning of the rotatable support member, is moved adjacent a capstan located near the arcuate path for cooperation with the capstan in driving the tape during recording and reproducing operations. Further, in the preferred embodiment of the invention, the rotatable support member also carries a plurality of tape guide members which are spaced apart along the arcuate path in trailing relation to the pinch roller considered in the direction of movment of the support member for the loading operation, and which engage the other side of the extended loop for holding the same away from the circumferential surface of the guide drum.

It is still another feature of this invention to provide the magnetic recording and/or reproducing apparatus with a holder for the cassette or cartridge constituting the tape supply, which holder is movable between a raised position for receiving the cassette or cartridge and a lowered position for positioning the cassette or cartridge, for example, with respect to shafts for controlling the rotational movements of the supply and take-up reels in the cassette or cartridge, and in which the movements of the holder between its raised and lowered positions are controlled in response to rotation of the rotatable support member or ring of the tape loading and unloading device.

The above, and other objects, features and advantages of this invention, will be apparent from the following detailed description of illustrative embodiments thereof which is to be read in connection with the accompanying drawings, wherein.

Figure 1:
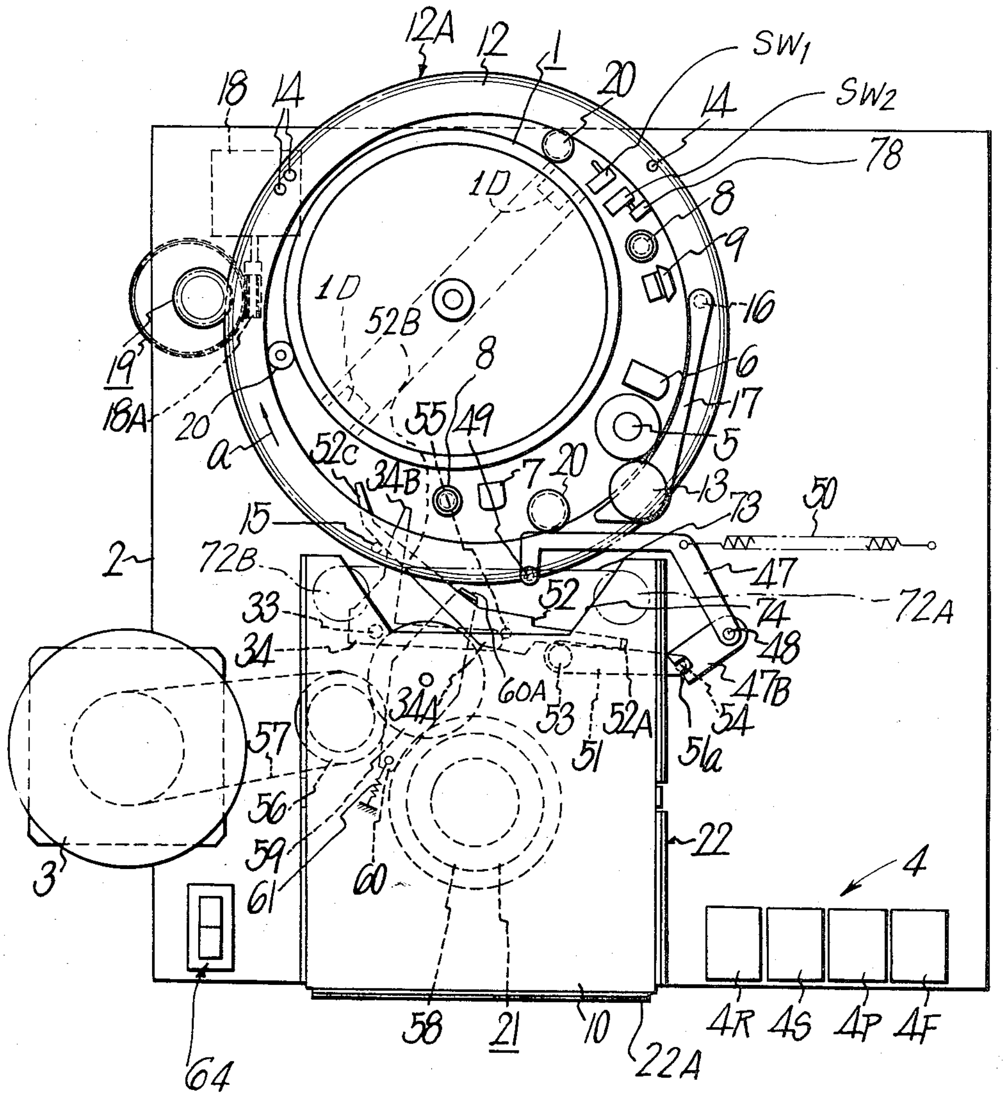
FIG. 1 is a schematic top plan view of a magnetic recording and/or reproducing apparatus provided with a tape loading and unloading device according to one embodiment of this invention.
Figure 2:
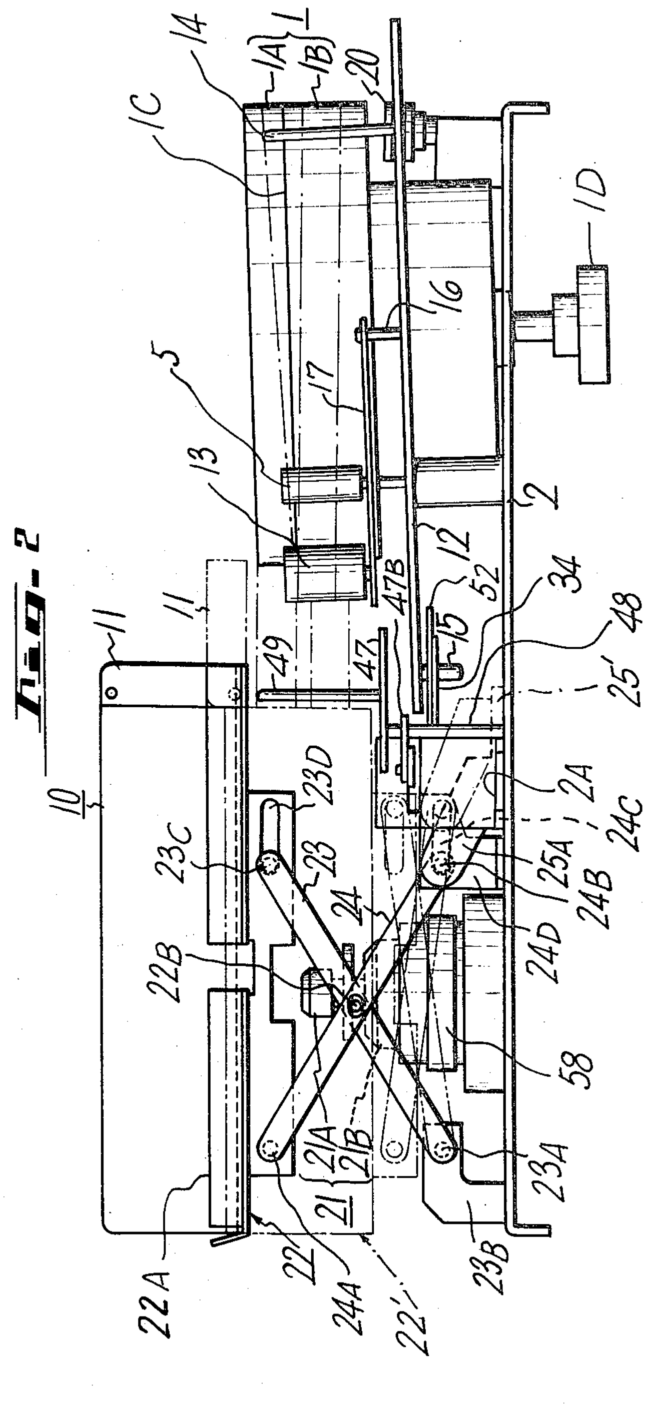
FIG. 2 is an enlarged, schematic side elevational view of the magnetic recording and/or reproducing apparatus of FIG. 1.

Referring to the drawings in detail, and initially to FIGS. 1 and 2 thereof, it will be seen that, in a magnetic recording and/or reproducing apparatus according to this invention, as there illustrated, a cylindrical tape guide drum 1 is mounted on a chassis 2 with the axis of drum 1 being slanted forwardly from the vertical. The tape guide drum 1 includes an upper portion 1A and a lower portion 1B defining a circumferential slot 1C therebetween (FIG. 2), and the drum contains a rotary magnetic head assembly appearing in broken lines on FIG. 1 and being made up of one or more magnetic heads 10 which are moved along the gap 1C, that is, in a circular path substantially coinciding with the circumferential surface of drum 1. A shaft extends downwardly from the mentioned magnetic head assembly and carries a pulley 1D below chassis 2 (FIG. 2) and a belt and pulley transmission (not shown) is engageable with the pulley 1D for driving the rotary magnetic head assembly, for example, from a main drive motor 3 (FIG. 1) which is fixedly attached to chassis 2. The chassis 2 further carries a control button assembly 4, for example, made up of pushbuttons 4R,4S,4P and 4F, as shown, for selecting various operating modes of the recording and/or reproducing apparatus, for example, for selecting the rewinding operation in the case of button 4R, for stopping operation of the apparatus in the case of the button 4S, for selecting the normal forward operation of the apparatus for recording and reproducing in the case of the button 4P, and for selecting the fast forwarding operation in the case of the button 4F. Each of the control buttons 4R, 4S, 4P and 4F is, as usual, associated with a corresponding linkage and drive mechanism (not shown) which forms no part of the present invention, but which is operative to achieve the corresponding driving condition or operation when the respective control button is pushed or depressed.

A capstan 5 which is suitably driven from the drive motor 3, a fixed magnetic head 6 for recording and/or reproducing audio and control signals, an erasing head 7 and tape guides 8 and 9 are mounted on chassis 2 at predetermined spaced apart positions along the periphery of circumference of guide drum 1. A holder 22 which is hereinafter described in detail is mounted on chassis 2 in front of tape guide drum 1 and is intended to receive and position a magnetic tape supply, for example, in the form of a tape cassette 10. In order to operate the magnetic recording and/or reproducing apparatus, it is necessary to load the tape from cassette 10 on holder 22 about at least a portion of the circumferential surface of guide drum 1 for scanning by the rotary magnetic head assembly associated with the guide drum, and further to engage the magnetic tape with capstan 5 so that the latter will drive the tape and also with the fixed magnetic heads 6 and 7. When it is desired to remove the cassette 10 from the apparatus at the conclusion of a recording or reproducing operation, it is necessary to unload the tape from about drum 1 and to return the tape to the cassette 10.

In accordance with the present invention, a device for performing the above described tape loading and unloading functions generally includes a support member 12 which is preferably in the form of a ring, as shown, and which is rotatable about guide drum 1 in a circular or arcuate path that extends between drum 1 and the holder 22. The support ring 12 may be disposed eccentrically with respect to guide drum 1, as shown on FIG. 1, to provide a relatively large space therebetween, at the front and to one side of drum 1, for accommodating capstan 5, heads 6 and 7 and tape guides 8 and 9. Further, support ring 12 is preferably mounted so that its plane of rotation is normal to the axis of guide drum 1, that is, so that such plane of rotation slants downwardly toward the front, as shown on FIG. 2. Support ring 12 is rotatably supported by grooved rollers 20 which engage the inner periphery of ring 12 and which are suitably mounted above chassis 2. In order to effect turning of support ring 12 about drum 1 through approximately 360° between a first position shown on FIG. 1 and a second position indicated at 12'' on FIG. 3, the entire outer periphery of ring 12 is formed with gear teeth 12A which are meshed with a gear mechanism 19 connected to the rotated shaft 18A of a reversible D.C. motor 18.

Figure 3:
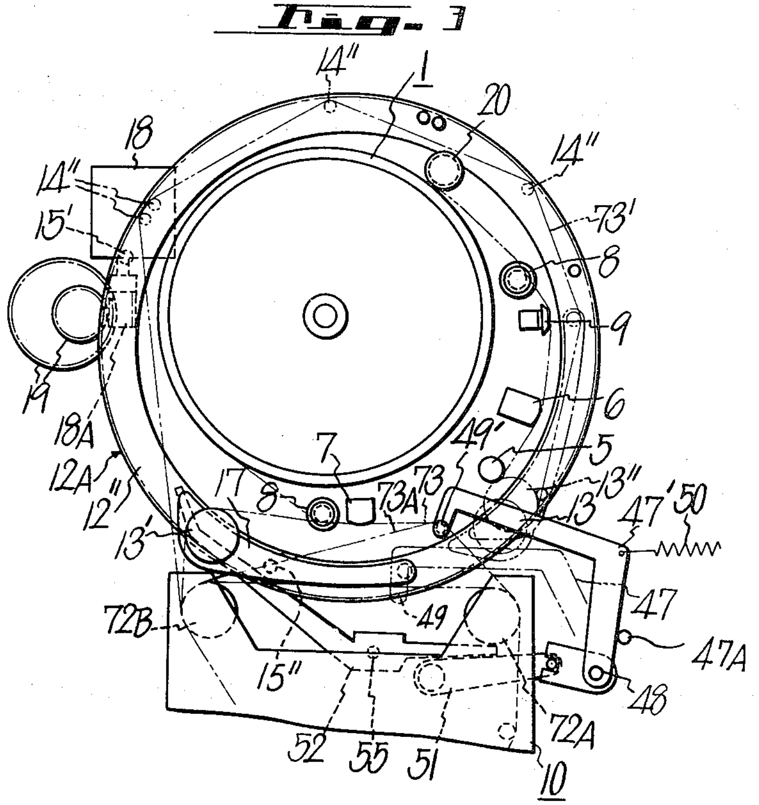
FIG. 3 is a fragmentary, schematic top plan view of a portion of the apparatus shown on FIG. 1, but showing parts thereof in various positions during the tape loading operation.

Extending upwardly from support ring 12 preferably normal to the plane of rotation of the latter is a tape engaging member 13 which, in the embodiment illustrated, is a rotatable pinch roller which is located on ring 12 so that, when the support ring is turned from the position shown on FIG. 1 to its second position for disposing the pinch roller at the position indicated at 13'' on FIG. 3, the pinch roller is located adjacent the rotary capstan 5 for cooperation with the latter in driving a magnetic tape therebetween. In the embodiment shown, the pinch roller 13 is rotatably mounted on the free end of an arm 17 which is pivoted at its other end, as at 16, on support ring 12, and the arm 17 may be spring urged to provide for engagement of the pinch roller, when in the position indicated at 13'' on FIG. 3, with capstan 5. Alternatively, arm 17 may be spring urged to provide a small gap between the pinch roller, when at the position 13'', and capstan 5, and an additional mechanism (not shown) may be provided to swing arm 17 and engage pinch roller 13 with capstan 5 in response to actuation of the control button 4P for initiating either a recording or reproducing operation of the apparatus.

The support ring 12 further carries a plurality of tape guide members 14, for example, in the form of pins, which extend upwardly from ring 12 at spaced apart locations in trailing relation to the pinch roller 13 considered in the clockwise direction of rotation of ring 12, as viewed on FIG. 1. Finally, an abutment member 15, shown in the form of a pin, depends from the underside of support ring 12 and is located along the latter so as to be positioned at the forward portion of ring 12 when the latter is in its first position shown on FIG. 1.

Figure 4:
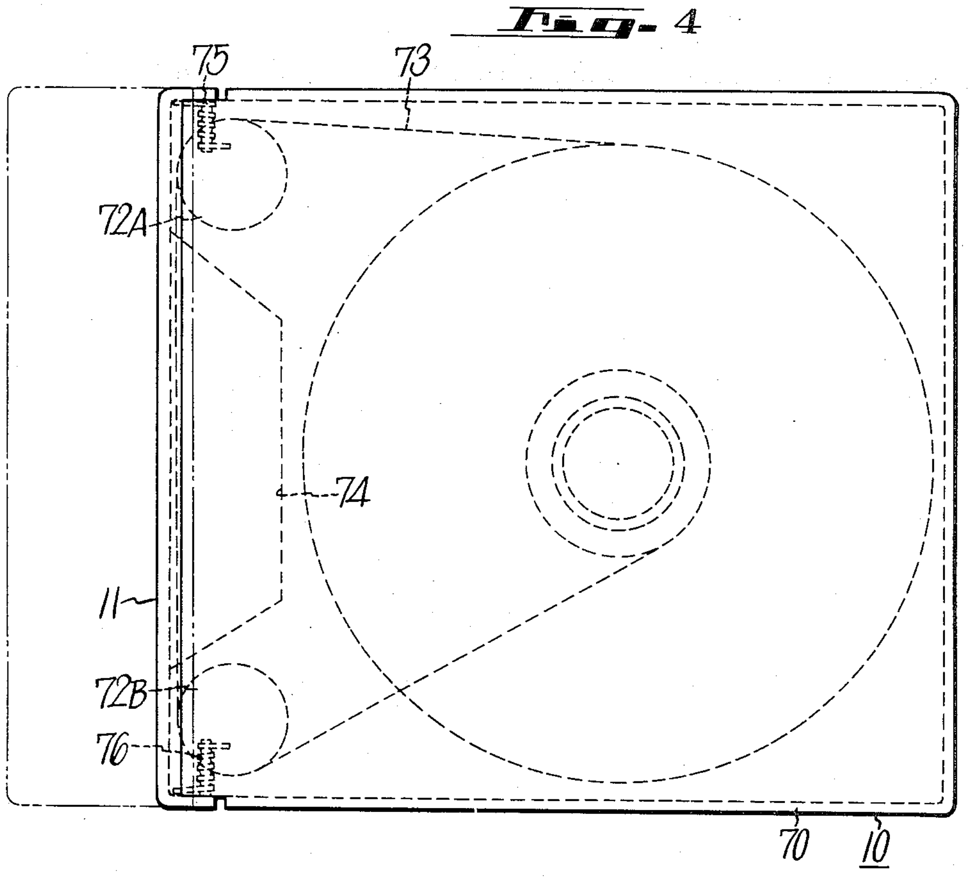
FIGS. 4 and 5 are respectively an enlarged top plan view and an enlarged side elevational view of a tape cassette which can be employed in the magnetic recording and/or reproducing apparatus embodying a tape loading and unloading device according to this invention.
Figure 5:
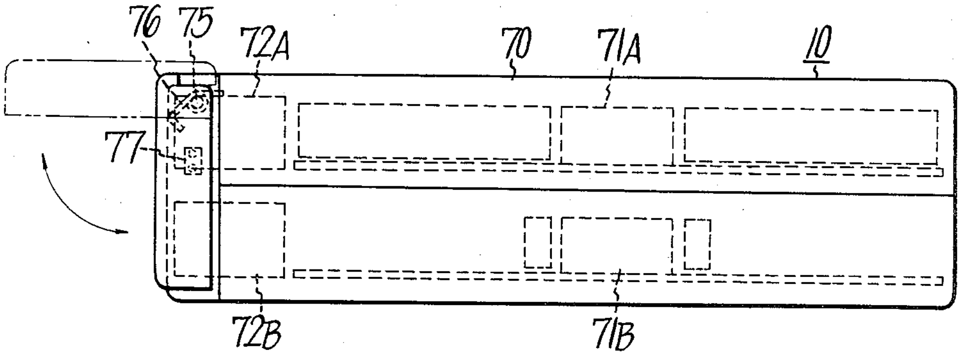

Referring to FIGS. 4 and 5, it will be seen that the tape cassette intended for use in the magnetic recording and/or reproducing apparatus according to this invention may be of the type having a rectangular housing 70 containing rotatable supply and take-up reels 71A and 71B which are disposed one above the other within the casing or housing 70 and which have the magnetic tape 73 wound thereon. The housing or casing 70 is open at the end thereof which faces rearwardly when cassette 10 is received by holder 22, and guides 72A and 72B are disposed at opposite sides of such open end of housing 70 at the levels of reels 71A and 71B, respectively, for guiding a run of the tape 73 between reels 71A and 71B along a path that extends across the open end of housing 70 and that slants downwardly in the direction from guide 72A to guide 72B. The bottom wall of cassette housing 70 has a cutout 74 which extends from the open end of housing 70 between guides 72A and 72B. Further, a lid or cover 11 extends across the back open end of cassette housing 70 and is pivotally mounted, as on pins 75 to swing between a closed position shown in full lines on FIGS. 4 and 5 and a raised, opened position indicated in broken lines. Springs 76 may be provided about the hinge pins 75 for urging cover or lid 11 to its raised, open position, and a latch mechanism, indicated schematically at 77, may be provided for releasably holding cover or lid 11 in its closed position.

The holder 22 for the cassette 10 is shown on FIG. 2 to include a platform 22A mounted above chassis 2 for vertical movement between a raised position shown in full lines on FIG. 2 and at which holder 22 is adapted to receive the cassette 10, and a lowered position, indicated in broken lines at 22', and at which the holder positions the cassette with respect to a reel shaft assembly 21 and also with respect to the tape loading and unloading device according to this invention, as hereinafter described in detail. In the illustrated embodiment of the invention, the mounting for the holder platform 22A is shown to include, at each side of the platform 22A, a pair of crossed rods 23 and 24 which are pivotally connected to each other at their midpoints, as at 22B. The forward end of rod 23 is pivotally connected, as at 23A, to a fixed bracket 23B on chassis 2, and the back end of rod 23 carries a pin 23C which is slidable in a slot 23D formed in platform 22A. Similarly, the forward end of rod 24 is pivotally connected to platform 22A, as at 24A, and the back end of rod 24 carries a pin 25B which is slidable along a slot 24C formed in a bracket 24D fixed on chassis 2.

It will be apparent that the movement of each pin 24B along the respective slot 24C will serve to change the distance between pins 23A and 24B and thereby change the angular relationship of rods 23 and 24 for either raising or lowering platform 22A. In the embodiment shown, platform 22A is gravitationally urged to its lowered position by the weight of holder 22 and of the cassette 10 received on platform 22A, with pins 23C and 24B moving rearwardly along the respective slots 23D and 24C in response to downward movement of platform 22A to its lowered position. In accordance with this invention, a control is provided for holder 22 and is operative to dispose holder 22 in its raised position for receiving a cassette 10 when support ring 12 is disposed in its first position shown on FIG. 1, and further to permit the movement of holder 22 to its lowered position in response to the turning of ring 12 in the clockwise direction, as viewed on FIG. 1, from the first position there shown. The control for holder 22 is shown to include a slide 25 (FIGS. 1A and 2) which is slidable forwardly and rearwardly on chassis 2 and extends laterally between the brackets 24D. The slide 25 has forwardly and upwardly bent end portions 25A which are connected with pins 24B so that forward and rearward displacement of slide 25 will be accompanied by corresponding movements of the pins 24B in the respective slots 24C. Intermediate its ends, the slide 25 has an upstanding tab 25B (FIG. 1A) which is engageable, from in back, by a laterally extending arm 34A of a bellcrank 34 swingable on a pivot pin 33. The pivot pin 33 may depend from an arched frame member 2A secured on chassis 2 and extending across the latter under platform 22A in the lowered position of the latter. The bellcrank 34 further has a rearwardly directed arm 34B which, in the first position of support ring 12 shown on FIG. 1, is engaged by abutment pin 15, as shown on FIG. 1A, so that bellcrank 34 is urged by pin 15 in the clockwise direction to move slide 25 forwardly and thereby maintain platform 22A in its raised position. It will be apparent that, during the initial increment of movement of support ring 12 in the clockwise direction from the position shown on FIG. 1, the resulting movement of abutment pin 15 will permit turning of bellcrank 34 in the counterclockwise direction, as viewed on FIG. 1A, whereby to move arm 34A rearwardly away from tab 25B for permitting rearward movement of slide 25, and hence permitting platform 22A to be moved downwardly, by gravity, to its lowered position. Conversely, when support ring 12 is turned in the counterclockwise direction for return to its position shown on FIG. 1, pin 15 will engage bellcrank 34 during the final increment of such return movement of ring 12 and will rock bellcrank 34 in the clockwise direction back to the position shown on FIG. 1A for returning platform 22A to its raised position.

As shown schematically on FIG. 2, the reel shaft assembly 21 which extends above chassis 2 under platform 22A includes a supply reel shaft 21A which is disposed above and extends coaxially through a take-up reel shaft 21B. The supply and take-up reel shafts 21A and 21B are vertically disposed so as to be positioned substantially below platform 22A in the raised position of the latter. However, when platform 22A is moved downwardly to its lowered position, as described above, reel shafts 21A and 21B extend upwardly through suitable openings (not shown) provided in platform 22A and in the bottom wall of the cassette 10 received by the platform, and reel shafts 21A and 21B enter into rotatably coupled engagement with the reels 71A and 71B within cassette 10. Thus, when platform 22A moves from its raised position to its lowered position with a cassette 10 disposed on the platform 22A, the reels 71A and 71B are moved into coupled engagement with the respective shafts 21A and 21B of the reel shaft assembly 21. The latch mechanism 77 which holds lid 11 of cassette 10 in its closed position may be manually released prior to the downward movement of the cassette with holder 22A or, if desired, a suitable device (not shown) may be provided for automatically releasing the latch mechanism 77 in response to the movement of cassette 10 downwardly with platform 22A to the lowered position of the latter.

The tape loading and unloading device in accordance with this invention is further shown to include a lever 47 (FIGS. 1,1A,2 and 3) which is mounted, at one end, on a rotatable shaft 48 extending upwardly from chassis 2 adjacent one side of holder 22. Lever 47 is shown to extend from turnable shaft 48 generally in the lateral direction between drum 1 and holder 22 and carries an upstanding tape engaging member or pin 49 at the free end of lever 47. It will be seen that, in response to the swinging movement of lever 47 on shaft 48, tape engaging pin 49 travels across the arcuate path of support ring 12 between an inoperative position shown on FIGS. 1 and 1A and an operative position indicated at 49' on FIG. 3. A spring 50 is connected to lever 47 for urging the latter to swing in the clockwise direction for disposing the tape engaging member at its operative position 49' on FIG. 3, which operative position is determined by the engagement of lever 47 with a stop 47A.

Figure 1A:
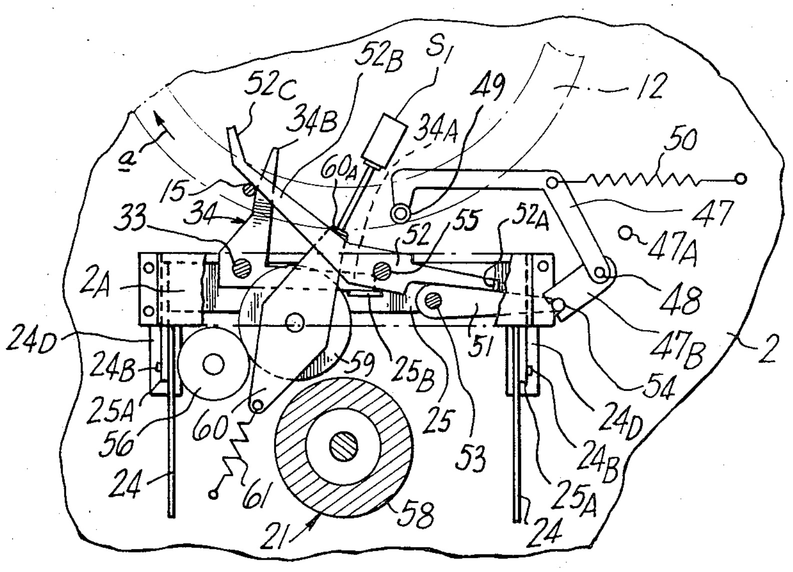
FIG. 1A is a fragmentary top plan view of a portion of the apparatus shown on FIG. 1, but with the holder of such apparatus for receiving and positioning a cassette or tape supply being removed for better showing the underlying elements of the apparatus.

The movements of tape engaging member 49 between its inactive or inoperative position shown on FIGS. 1 and 1A and its operative position shown in full lines on FIG. 3 are preferably also controlled in response to rotation of support ring 12. Thus, in the illustrated embodiment, an arm 47B is fixed on shaft 48 and has a slot at its free end which receives a pin 54 carried by an arm 51 which is turnable about a pivot 53 depending from arched frame 2A. A lever 52 is pivoted, intermediate its ends, on a pin 55 also depending from arched frame 2A and is engageable, at one of its ends 52A, with arm 51. The other end or arm 52B of lever 52 extends under support ring 12 and is engageable by abutment pin 15 when support ring 12 is in its first position shown on FIGS. 1 and 1A. It will be apparent that abutment pin 15, when engaged with arm 52B of lever 52, urges the latter in the clockwise direction, as viewed on FIG. 1A, so that end 52A of lever 52 acts forwardly against arm 51 to turn the latter in the clockwise direction about its pivot 53 and, by reason of the interconnection between arms 52 and 54, to turn shaft 48 and lever 47 in the counterclockwise direction for moving tape engaging member 49 to its inactive or inoperative position against the force of spring 50. It will be seen that as support ring 12 initially moves in the direction of arrow *a*, that is, in the clockwise direction, from the position shown on FIGS. 1 and 1A, the longitudinal edge portion of lever arm 52B that is engaged with abutment pin 15 during such initial movement extends approximately tangentially with respect to the path of abutment pin 15 so that tape engaging member 49 remains in its inactive or inoperative position shown on FIGS. 1 and 1A during such initial increment of movement of support ring 12. However, since the arm 34B of bellcrank 34 extends approximately radially with respect to support ring 12, substantial turning of bellcrank 34 does occur during the initial increment of movement of support ring 12 from its first position shown on FIGS. 1 and 1A. Thus, downward movement of holder 22 to its lowered position occurs during the initial increment of movement of ring 12 in the direction of the arrow *a*, while tape engaging member 49 is retained in its inactive or inoperative position appearing on FIGS. 1 and 1A. As the movement of support ring 12 from its first position continues beyond the point at which holder 22 is in its lowered position, abutment pin 15 comes into engagement with the end portion 52C of lever arm 52B, which end portion is angled inwardly with respect to support ring 12. Thus, as abutment pin 15 moves along angled end portion 52C of the lever arm, lever 52 is free to turn gradually in the counterclockwise direction to the position shown on FIG. 3, whereby to permit spring 50 to swing lever 47 and thereby move the tape engaging member to its operative position indicated at 49' on FIG. 3.

In order to effect rotation of the takeup reel shaft 21B, a drive wheel 56 is rotatably mounted on chassis 2 and is connected through a belt and pulley transmission 57 (FIG. 1) with the shaft of drive motor 3. An idler wheel 59 is interposed between the drive wheel 56 and a rim 58 which is rotatably coupled with take-up reel shaft 21B, and such idler wheel 59 is rotatably mounted on a movable support 60 which is urged by a spring 61 in the direction for engaging the periphery of idler wheel 59 with drive wheel 56 and rim 58. In order to control the engagement of idler wheel 59 with rim 58, and hence to control the driving of take-up reel shaft 21B when motor 3 is energized, movable member 60 which supports idler wheel 59 may be formed with a lug 60A (FIG. 1A) which is engageable by lever arm 52B when lever 52 is positioned to dispose tape engaging member 49 in its inoperative or inactive position, and thereby to hold idler wheel 59 away from rim 58. Further, a solenoid $S_1$ may have its armature connected with the lug 60A for displacing movable member 60 to the position shown on FIG. 1A, that is, for spacing idler wheel 59 from rim 58, whenever solenoid $S_1$ is energized to retract its armature.

In order to control the rotational movements of support ring 12 between its first and second positions for loading and unloading the tape with respect to guide drum 1, normally closed limit switches $SW_1$ and $SW_2$ (FIG. 1) are fixedly mounted on chassis 2 adjacent support ring 12 and are selectively actuable by an abutment 78 extending from ring 12. As shown, when support ring 12 is in its first position, abutment 78 engages limit switch $SW_2$ for opening the contacts of the latter and, conversely, when support ring 12 is in its second position, for example, at the conclusion of a tape loading operation, abutment 78 engages limit switch $SW_1$ for opening the contacts of the latter. The controls for the tape loading and unloading device according to this invention further include a two-position switch 64 for selectively initiating either the tape loading or tape unloading operation of such device. As shown on FIG. 7, switch 64 has a movable contact connected with one terminal of a D.C. source E and being selectively engageable with one or the other of two fixed contacts 64A and 64B which respectively correspond to the loading and unloading operations of the device according to this invention. The switch 64 is further shown to be ganged or mechanically interconnected, as indicated by the broken line 64C, with a reversing switch 64' having its movable contact connected with the opposite terminal of source E and being provided with fixed contacts 64'A and 64'B which are alternatively engaged by the movable contact of the reversing switch simultaneously with the engagement of the movable contact of switch 64 with either the fixed contact 64A or 64B, respectively. Switch 64 is further shown to be ganged or mechanically interconnected, as indicated by the broken line 64D, with a switch 64'' which connects the drive motor 3 with an electrical source A.C. when switch 64 is actuated to engage its movable contact with either the fixed contact 64A or the fixed contact 64B.

Figure 7:
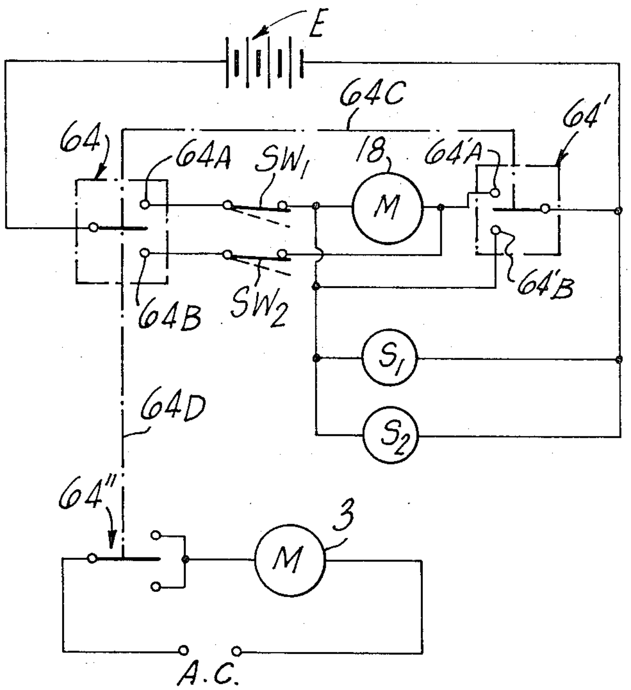
FIG. 7 is a schematic diagram of an electrical control system for controlling the tape loading and unloading device of a magnetic recording and/or reproducing apparatus according to this invention.

In the control circuit shown on FIG. 7, actuation of switch 64 to engage its movable contact with fixed contact 64A connects the reversible D.C. motor 18 for driving support ring 12 to the opposite terminals of source E through contact 64A and switch $SW_1$ in series and through contact 64'A of reversing switch 64' so that current flows through motor 18 in the direction for effecting clockwise rotation of support ring 12, as viewed on FIG. 1, until such time as abutment 78 engages limit switch $SW_1$ for opening the normally closed contacts of the latter. Conversely, when switch 64 is actuated to engage its movable contact with fixed contact 64B, motor 18 is connected with the opposite terminals of source E through closed contact 64B and limit switch $SW_2$, in series, and through the closed contact 64'B of reversing switch 64', but, in this case, the current flows through motor 18 in the opposite direction so as to effect counterclockwise turning of support ring 12, as viewed on FIG. 1, until abutment 78 returns to the position shown on FIG. 1 to actuate switch $SW_2$ and thereby open its normally closed contacts.

As shown on FIG. 7, the previously mentioned solenoid $S_1$ which, when energized, holds idler wheel 59 out of engagement with rim 58, may be connected to one terminal of source E through contact 64A and switch $SW_1$, in series, and directly to the opposite terminal of source E so that solenoid $S_1$ is energized during the tape loading operation, that is, during the turning of support ring 12 in the clockwise direction from the position shown on FIG. 1 to the position where abutment 78 actuates switch $SW_1$ to open the contacts of the latter. Further, a brake operating solenoid $S_2$ may be connected in parallel with solenoid $S_1$, as shown, so as to be energized simultaneously therewith. The solenoid $S_2$ is operative, when energized, to engage a brake (not shown) by which rotation of the supply reel shaft 21A is prevented during the tape loading operation.

The above described magnetic recording and/or reproducing apparatus having a tape loading and unloading device in accordance with this invention operates as follows:

With support ring 12 and the other elements of the apparatus in the positions thereof shown on FIG. 1, a cassette 10 is placed on platform 22A, which is in its raised position, with the lid 11 being disposed at the back end of the cassette as placed on the platform. Then switch 64 is manually actuated to its position for initiating the loading operation, that is, for engaging the movable contact of switch 64 with its fixed contact 64A. As a result of such actuation of switch 64, motor 18 is operated in the direction for turning support ring 12 clockwise from the position shown on FIG. 1 and, simultaneously, motor 3 is also operated. However, due to the energizing of solenoid $S_1$, idler wheel 59 is held out of engagement with rim 58 so that the operation of motor 3 does not cause rotation of take-up reel shaft 21B. Further, due to the energizing of solenoid $S_2$ for engaging the previously mentioned brake associated with the supply reel shaft 21A, rotation of the latter is prevented.

During the initial increment of the clockwise rotation of support ring 12 from the position shown on FIG. 1, the movement of abutment pin 15 away from bellcrank 34 permits turning of the latter in the counterclockwise direction, and consequently permits rearward movement of slide 25 so that, due to the weight of the cassette 10 and platform 22A, platform 22A moves downwardly to its lowered position. If the latch mechanism 77 of cassette 10 has not been manually released prior to the placement of the cassette on platform 22A, the release of latch mechanism 77 may be automatically effected by a suitable device (not shown) which acts on the latch mechanism in response to the downward movement of cassette 10 with platform 22A.

In any case, by reason of the previously described configuration of the arm 52B of lever 52, tape engaging member or pin 49 is substantially maintained at its inoperative or inactive position during the downward movement of platform 22A to its lowered position so that, during such downward movement of the platform, tape engaging member or pin 49 extends upwardly into the cassette 10 through the cutout 74 in the bottom wall of the latter so as to be disposed in front of the run of the tape 73 which extends between guides 72A and 72B of the cassette. As the initial rotation of support ring 12 in the clockwise direction continues, that is, as abutment pin 15 moves along the angled end portion 52C of lever 52, progressive turning of lever 52 in the counterclockwise direction is permitted and spring 50 turns lever 47 in the clockwise direction on shaft 48 so as to move tape engaging member 49 across the arcuate path of support ring 12 to the operative position indicated at 49' on FIG. 3. It will be apparent that, during the movement of the tape engaging member to its operative position 49', the tape engaging member will draw tape from the cassette 10 and form the withdrawn tape into an initial loop 73A which extends across the arcuate path of support ring 12. Since rotation of supply reel shaft 21A, and hence of supply reel 71A which is coupled therewith in the lowered position of platform 22A, is braked by the energization of solenoid $S_2$, it will be apparent that the tape withdrawn from cassette 10 for forming of the initial loop 73 A is unwound from the take-up reel 71B.

Since the tape guide 72A in the cassette 10 is at a higher level than the tape guide 72B, it will be apparent that the side of the initial tape loop 73A extending between tape engaging member 49' and tape guide 72A will be at a higher level than the side of the initial tape loop extending between tape engaging member 49' and tape guide 72B. Thus, as rotation of support ring 12 continues in the clockwise direction, pinch roller 13 will move under the relatively high side of initial tape loop 73A and will move into engagement with the relatively lower side of the tape loop extending between tape engaging member 49' and tape guide 72B. During continued rotation of support ring 12 in the clockwise direction, the pinch roller will act against the initial tape loop, for example, as indicated at 13' on FIG. 3, to further withdraw tape from the take-up reel within cassette 10 and to progressively extend the tape loop. As the pinch roller moves from the position indicated at 13' to the position indicated at 13'' on FIG. 3 as a result of continued rotation of support ring 12 in the clockwise direction, the side of the loop extending between tape guide 72A and the pinch roller is wrapped about at least a portion of the circumferential surface of guide drum 1 and, during such continued rotation of support ring 12, the additional tape guides 14 move under the relatively high side of the tape loop between tape guide 72A and tape engaging member 49' and come into successive engagement with the opposite side of the extended tape loop, that is, with the tape loop extending from the pinch roller at 13'' and tape guide 12B, for example, as indicated at 14'' on FIG. 3, so taht such other side of the tape loop is held out of engagement or away from the circumferential surface of drum 1.

When the pinch roller has attained the position indicated at 13'' on FIG. 3, abutment 78 on support ring 12 actuates switch $SW_1$ to open the contacts of the latter and thereby halt the operation of motor 18 and the turning of support ring 12. Further, the opening of switch $SW_1$ causes deenergizing of solenoids $S_1$ and $S_2$. The deenergizing of solenoid $S_1$ permits spring 60 to move idler wheel 59 into engagement with rim 58 so that motor 3 is then effective to cause rotation of takeup reel shaft 21B and of takeup reel 71B coupled with that shaft. Further, the deenergizing of solenoid $S_2$ serves to disengage the mentioned brake associated with the supply reel shaft 21A, whereby to permit free rotation of the supply reel 71A. Upon the conclusion of the tape loading operation, that is, when the pinch roller has attained the position indicated at 13'' on FIG. 3, the pinch roller is adjacent capstan 5 for cooperation with the latter in driving the tape either immediately upon the completion of the tape loading operation or in response to the actuation of the control button 4P for initiating a recording or reproducing operation. It will further be seen that, at the conclusion of the tape loading operation, the tape extending between tape guide 72A in cassette 10 and the circumferential surface of guide drum 1 is engaged successively with tape engaging member 49', erasing head 7 and the adjacent tape guide 8, whereas the tape extending between the circumferential surface of guide drum 1 and the pinch roller at the position 13'' is successively engaged with the tape guides 8 and 9 and the fixed head 6 for recording and/or reproducing audio and/or control signals. Since tape engaging member 49' is urged to its operative position by the spring 50 acting on lever 47, it is apparent that the tape engaging member 49' acts as a tension control, that is, serves to maintain a substantially constant tension in the tape, as determined by the spring 50, during the advancement of the tape by the cooperative action of capstan 5 and the pinch roller.

When it is desired to unload the tape from guide drum 1 and return the tape to within cassette 10, switch 64 is manually actuated to engage its movable contact with the fixed contact 64B. Thus, motor 18 is energized through closed contact 64B and switch $SW_2$, in series, and through closed contact 64'B of reversing switch 64' so as to operate motor 18 in the direction for causing counterclockwise rotation of support ring 12. Further, it will be apparent that, during the counterclockwise or reverse turning of support ring 12, solenoids $S_1$ and $S_2$ are deenergized and switch 64'' closes one of its contacts for operating drive motor 3. Thus, as the pinch roller moves from the position indicated at 13'' on FIG. 3 back to the position indicated at 13', the tape loop is shortened and motor 3 drives rim 58 and take-up reel shaft 21B through the engagement of idler wheel 59 with rim 58 so that the excess tape created by shortening of the tape loop is rewound upon the take-up reel 71B. When the counterclockwise turning of support ring 12 has progressed to the point where abutment pin 15 nears angled end portion 52C of lever 52, the pinch roller 13 moves out of the small tape loop that remains under the side of that small tape loop extending between tape engaging member 49 and tape guide 72A. Thereafter, as the counterclockwise or return rotation of support ring 12 continues back toward its first or initial position, abutment pin 15 acts on lever end portion 52C to swing lever 52 in the clockwise direction and thereby cause return of tape engaging member 49 to its inoperative or inactive position shown on FIG. 1 so that the tape is then fully contained within cassette 10. During such clockwise turning of lever 52, the arm 52B thereof acts on the lug 60A of the movable support member 60 to displace the latter against the force of spring 61 and thereby disengage idler wheel 59 from rim 58 so that the rotation of take-up reel shaft 21B and of the take-up reel 71B is thereby halted. During the final increment of the return rotation of support ring 12 to its initial or first position, abutment pin 15 acts on arm 34B of bellcrank 34 to turn the latter in the clockwise direction as viewed on FIGS. 1 and 1A so that the arm 34A acts forwardly on slide 25 to displace the latter in the forward direction and thereby cause arms 23 and 24 to return platform 22A and the cassette 10 thereon to the raised position shown in full lines on FIG. 2. With platform 22A returned to its raised position, cassette 10 thereon is disengaged from the reel shaft assembly 21 and thus can be removed from platform 22A. During the upward movement of platform 22A to its raised position, the lid 11 of the cassette 10 on the platform can be automatically returned to its closed position, or closing of the lid can be manually effected upon the removal of the cassette from platform 22A. Finally, when support ring 12 has been returned to its first or initial position, abutment 78 actuates switch $SW_2$, as shown on FIG. 1, whereby to interrupt the circuit for energizing motor 18 and thereby halting the turning of support ring 12 in the counterclockwise direction.

Figure 6:
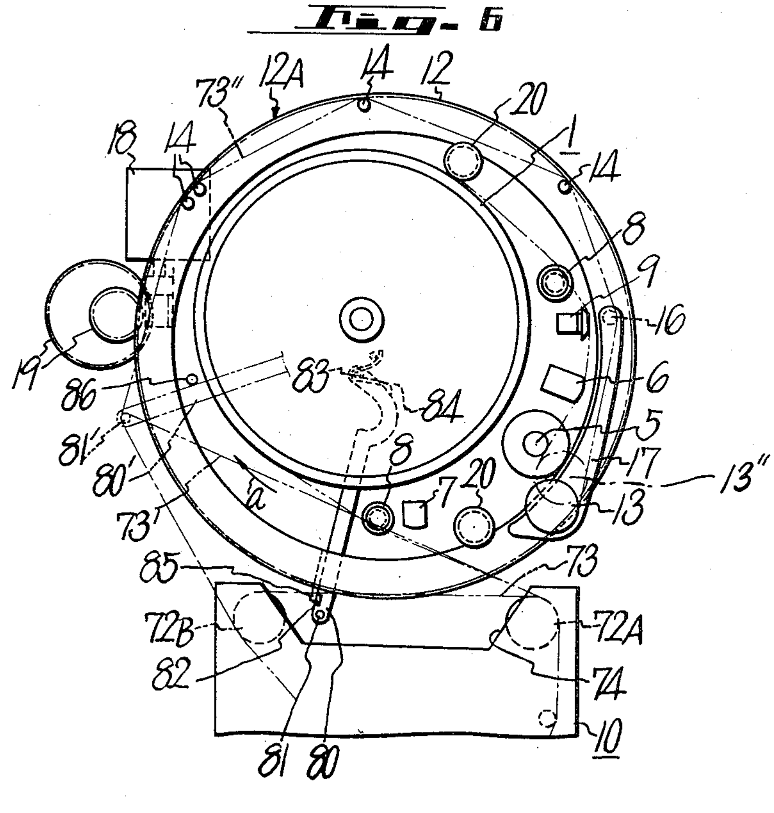
FIG. 6 is a view similar to that of FIG. 3, but showing another embodiment of this invention.

Referring now to FIG. 6, it will be seen that the embodiment of the invention there illustrated is generally similar to the apparatus previously described with reference to FIGS. 1–3 and 7, and has its several corresponding parts identified by the same reference numerals. The apparatus of FIG. 6 differs from that previously described substantially only with respect to the tape engaging member which is provided for drawing tape from the cassette 10 into an initial loop extending across the arcuate path of the rotatable support ring 12 for engagement by the pinch roller 13 mounted on the support ring. In the embodiment of FIG. 6, the previously described lever 47 carrying tape engaging member 49 and the levers 51 and 52 for controlling the movements of lever 47 are replaced by a lever 80 swingable about a fixed pivot 83 located approximately at the center of rotation of support ring 12 and extending substantially radially with respect to the support ring so that the free end of lever 80 projects beyond the outer periphery of ring 12. An upstanding tape engaging member or pin 81 extends from the free end of lever 80 to move substantially parallel to the arcuate path of support ring 12 between an inoperative or inactive position shown in full lines on FIG. 6 and an operative position indicated in broken lines at 81'. A torsion spring 84 may be engaged with lever 80 to urge the latter to swing about its pivot 83 in the clockwise direction, as viewed on FIG. 6, whereby to urge tape engaging member 81 to its operative position 81' which is determined by engagement of lever 80 with a stop 86. An abutment 85 depends from support ring 12 and is engageable with a lug 82 on lever 80 so that, when support ring 12 is in its first or initial position, abutment 85 engages lug 82 to hold lever 80 in the position shown in full lines on FIG. 6 and thereby dispose tape engaging pin 81 in its inactive or inoperative position.

In the embodiment of FIG. 6, the abutment 85 is also effective to control the raising and lowering of a holder for receiving and positioning the cassette 10, in the same manner as that in which the abutment pin 15 of the first described embodiment is effective to control the raising and lowering of the holder 22 therein.

It will be apparent that, when support ring 12 of the embodiment illustrated on FIG. 6 is turned in the clockwise direction, for example, in the manner previously described, the resulting movement of abutment member 85 permits spring 84 to swing lever 80 from the position shown in full lines to the position indicated in broken lines at 80'. During such movement of lever 80, the tape engaging member or pin 81 draws tape from cassette 10 and forms the withdrawn tape into an initial loop indicated at 73' and which extends across the arcuate path of support ring 12.

As the initial loop 73' is being formed by tape engaging member 81, pinch roller 13 moves under the relatively high side of such loop adjacent tape guide 72A and eventually moves into engagement with the initial loop adjacent the tape engaging member in its operative position 81'. Thereafter, during further rotation of support ring 12 in the clockwise direction, pinch roller 13 is effective to extend the tape loop and wrap a portion of one side of the extended tape loop about a portion of the circumferential surface of tape guide drum 1. At the concluding of the tape loading operation, the extended tape loop is as indicated at 73'' on FIG. 6 with the pinch roller being at the position 13'' for cooperation with the capstan 5 in driving the tape. In the embodiment of FIG. 6, at the conclusion of the tape loading operation, the tape engaging member at its operative position 81' engages the side or run of the extended tape loop engaged by the guide pins 14, that is, extending from tape guide 72B in cassette 10 so as to further hold such run or side of the tape loop away from the circumferential surface of guide drum 1.

During tape unloading, the embodiment of FIG. 6 operates substantially in the same manner as the first described embodiment of the invention, that is, the counterclockwise turning of support ring 12 and the corresponding movement of pinch roller 13 progressively reduces the tape loop and the resulting slack is taken up by the take-up reel in cassette 10. During the final portion of the counterclockwise or return rotation of support ring 12, abutment member 85 acts on lever 80 to return the latter to the position shown in full lines on FIG. 6 so that the entire tape is returned to within the housing of cassette 10.

It will be apparent that, in each of the illustrative embodiments of the invention described above, a tape engaging member 49 or 81 is provided for forming an initial tape loop of predetermined size from tape withdrawn from the cassette 10 during the initial portion of a loading operation, whereupon a second tape engaging member, for example, in the form of the pinch roller 13, is inserted into the initial tape loop and further extends the tape loop for wrapping one side of the extended loop about at least a portion of the circumferential surface of the guide drum 1. THus, the wrapping of the magnetic tape about guide drum 1 for scanning by the rotary magnetic head or heads associated with the latter is surely and accurately effected.

Furhter, since the vertical movement of the holder 22 for receiving the cassette 10 in its raised position and for positioning the cassette 10 with respect to the reel shaft assembly 21 in its lowered position, as well as the loading and unloading operations on the magnetic tape are all effected in response to turning of the support ring 12, the construction of the apparatus according to this invention and its operation can be very simple.

Although illustrative embodiments of this invention have been described in detail herein with reference to the drawings, it is to be understood that the invention is not limited to those precise embodiments, and that various changes and modifications may be effected therein by one skilled in the art without departing from the scope or spirit of the invention.

What is claimed is:

1. A magnetic recording and/or reproducing apparatus comprising a cylindrical tape guide drum, at least one rotary magnetic head moved in a circular path substantially coinciding with the circumferential surface of said drum, tape supply means containing a magnetic tape, holder means spaced from said guide drum for receiving and positioning said tape supply means, support means rotatable around said drum in an arcuate path that extends between the latter and said holder means, first tape engaging means movable between an inactive position where it extends into said tape supply means and is engageable with said tape supply means positioned on said holder means and an operative position where said first tape engaging means draws an initial relatively small loop of said tape from said tape supply means across aid arcuate path of the rotatable support means between said holder means and said drum, and second tape engaging means carried by said rotatable support means and moving with the latter in said arcuate path outside of said tape supply means for engaging said initial loop of tape drawn from said tape supply means by said first tape engaging means and, after such engagement, further extending said loop for wrapping one side of the extended loop about at least a portion of said circumferential surface of the drum for scanning by said rotary head.

2. A magnetic recording and/or reproducing apparatus according to claim 1, in which said tape supply means includes reels having said magnetic tape wound thereon and tape guide members guiding a run of said tape between said reels to extend at a substantial angle to the plane of rotation of said rotatable support means when said tape supply means is positioned by said holder means, said first tape engaging means is engageable, in said inactive position, with said run of the tape so that said initial loop of tape drawn from said tape supply means by movement of said first tape engaging means to said operative position has its opposite sides at different levels with respect to said plane of rotation of said support means, and said second tape engaging means extends substantially normal to said plane of rotation of the support means for moving past one of said sides of the initial loop and engaging the other of said sides of the initial loop during the movement of said second tape engaging means in said arcuate path.

3. A magnetic recording and/or reproducing apparatus according to claim 2, in which said reels of the tape supply means are superposed one above the other with said tape run and said initial loop slanting downwardly from said one reel to said other reel when said tape supply means is positioned by said holder means.

4. A magnetic recording and/or reproducing apparatus according to claim 3, in which said second tape engaging means extends upwardly from said rotatable support means to pass under said one side of said initial loop extending from said one reel and to engage said other side of the initial loop extending from said other reel upon said movement of the second tape engaging means in said arcuate path between said holder means and said drum in the direction from said one side toward said other side of said initial loop.

5. A magnetic recording and/or reproducing apparatus according to claim 1, in which said support means is rotatable between first and second positions which are substantially angularly displaced from each other, and further comprising actuating means responsive to movements of said rotatable support means from and to said first position of the support means for moving said first tape engaging means from its said inoperative position to said operative position and for returning said first tape engaging means to said inoperative position thereof, respectively.

6. A magnetic recording and/or reproducing apparatus according to claim 5, in which said first tape engaging means includes a first tape guide pin carried by a lever which is swingable on a fixed pivot to move said first tape guide pin between said inoperative and operative positions, and in which said actuating means includes spring means yieldably urging said lever in the direction for moving said first tape guide pin to said operative position, abutment means on said rotatable support means, and means connected with said lever and engageable by said abutment means when said support means is in said first position for overcoming said spring means and moving said first tape guide pin to said inoperative position.

7. A magnetic recording and/or reproducing apparatus according to claim 6, in which said lever extends from said pivot generally in the lateral direction between said drum and said holder means so that said first tape guide pin travels across said arcuate path in moving between inoperative and operative positions.

8. A magnetic recording and/or reproducing apparatus according to claim 6, in which a fixed pivot is located approximately at the center of the rotational movement of said support means and said first tape guide pin is located on said lever to lie at the outside of said arcuate path and to move substantially parallel to said arcuate path between said inoperative and operative positions.

9. A magnetic recording and/or reproducing apparatus according to claim 5, in which said holder means is movable between a raised position for receiving said tape supply means with the latter being disposed above said first tape engaging means and a lowered position at which the tape contained by said tape supply means is engageable by said first tape engaging means in said inoperative position of the latter, and further comprising holder control means responsive to the initial and final increments of said movements of said rotatable support means respectively from and to said first position of the support means for moving said holder means from said raised position to said lowered position and for returning said holder means to said raised position, respectively.

10. A magnetic recording and/or reproducing apparatus according to claim 9, in which said holder means is gravitationally urged to said lowered position thereof, and said holder control means includes abutment means on said rotatable support means, and means connected with holder means and engageable by said abutment means when said rotatable support means is in said first position for retaining said holder means at said raised position.

11. A magnetic recording and/or reproducing apparatus according to claim 10, in which said first tape engaging means includes a first tape guide pin carried by a lever which is swingable on a fixed pivot for moving said first tape guide pin between said inoperative and operative positions, and in which said actuating means includes spring means yieldably urging said lever in the direction for moving said first tape guide pin to said operative position, and means connected with said lever and engageable by said abutment means when said support means is in said first position for overcoming said spring means and moving said first tape guide pin to said inoperative position.

12. A magnetic recording and/or reproducing apparatus according to claim 5, in which said second tape engaging means includes a pinch roller rotatably mounted on said rotatable support means to extend into said initial loop during movement of said support means from said first position of the latter, and further comprising a rotary capstan located to be adjacent said pinch roller in said second position of the rotatable support means for cooperation with said pinch roller in driving the magnetic tape therebetween.

13. A magnetic recording and/or reproducing apparatus according to claim 12, in which said second tape engaging means further includes a plurality of tape guide members extending from said rotatable support means and being spaced apart along said arcuate path in trailing relation to said pinch roller considered in the direction of movement of said support means from said first position to said second position for engaging the other side of said extended loop and holding said other side away from said circumferential surface of the guide drum.

14. A magnetic recording and/or reproducing apparatus according to claim 13, in which said first tape engaging means includes a first tape guide pin and means movably supporting said first tape guide pin for movement across said arcuate path from said inoperative position at the outside of said arcuate path to said inoperative position at the inside of said path, and in which said first tape guide pin, at said operative position, engages said one side of the extended tape loop between said tape supply means and said circumferential surface of the guide drum.

15. A magnetic recording and/or reproducing apparatus according to claim 13, in which said first tape engaging means includes a first tape guide pin and means movably supporting said first tape guide pin for movement substantially parallel to said arcuate path at the outside of the latter between said inoperative and operative positions, and in which said first tape guide pin, at said operative position, engages said other side of the extended tape loop between said tape guide members on the rotatable support means and said tape supply means.

16. A magnetic recording and/or reproducing apparatus according to claim 13, in which said tape supply means includes reels having said magnetic tape wound thereon to provide a run of said tape between said reels which extends at a substantial angle to the plane of rotation of said rotatable support means when said tape supply means is positioned by said holder means, said plane of rotation of said rotatable support means is below said tape run at least at the portion of said arcuate path that extends between said holder means and said guide drum so that said initial loop of tape drawn from said tape supply means has its opposite sides at different distances above said plane of rotation, and said pinch roller and tape guide members extend upwardly from said rotatable support means and pass under the side of said initial loop which is at the larger distance from said plane of rotation during the movement of said support means from said first position to said second position.

* * * * *